US00RE37745E

(19) United States
(12) Reissued Patent
Brandt et al.

(10) Patent Number: US RE37,745 E
(45) Date of Reissued Patent: Jun. 18, 2002

(54) CONTROL SYSTEM FOR A WATER HEATER

(75) Inventors: John H. Brandt, Carrollton; Randall T. Meyer, Garland; Bradley N. Plank, Dallas, all of TX (US)

(73) Assignee: AOS Holding Company, Wilmington, DE (US)

(21) Appl. No.: 09/648,587

(22) Filed: Aug. 25, 2000

Related U.S. Patent Documents

Reissue of:
(64) Patent No.: 5,797,358
Issued: Aug. 25, 1998
Appl. No.: 08/677,645
Filed: Jul. 8, 1996

(51) Int. Cl.[7] ..... F22B 37/42
(52) U.S. Cl. ..... 122/14.2; 122/448.1; 122/504; 431/22
(58) Field of Search ..... 122/14.2, 14.21, 122/14.22, 446, 447, 448.1, 448.2, 504, 504.1, 504.2; 126/351, 101; 431/6, 13, 22, 27, 25, 69, 70, 77, 78

(56) References Cited

U.S. PATENT DOCUMENTS

| | | | | | |
|---|---|---|---|---|---|
| 3,666,392 | A | * | 5/1972 | Julinot | 431/78 |
| 3,909,816 | A | * | 9/1975 | Teeters | |
| 4,299,554 | A | * | 11/1981 | Williams | |
| 4,330,261 | A | * | 5/1982 | Sun | |
| 4,443,791 | A | * | 4/1984 | Risgin | |
| 4,482,311 | A | * | 11/1984 | Wada et al. | |
| 4,638,789 | A | * | 1/1987 | Ueki et al. | 126/351 |
| 4,839,014 | A | * | 6/1989 | Park et al. | |
| 4,893,113 | A | * | 1/1990 | Park et al. | |
| 4,916,437 | A | * | 4/1990 | Gazzaz | |
| 4,935,603 | A | * | 6/1990 | Iwamoto et al. | 219/330 |
| 5,039,006 | A | * | 8/1991 | Habegger | |
| 5,189,392 | A | * | 2/1993 | Kass et al. | |
| 5,199,385 | A | * | 4/1993 | Doss | 122/13.1 |
| 5,239,980 | A | * | 8/1993 | Hilt et al. | |
| 5,280,802 | A | * | 1/1994 | Comuzie, Jr. | |
| 5,312,036 | A | * | 5/1994 | Trotter | 431/22 |
| 5,379,026 | A | * | 1/1995 | Whittle | |
| 5,419,358 | A | * | 5/1995 | Sun | |
| 5,442,157 | A | * | 8/1995 | Jackson | 219/492 |
| 5,447,125 | A | * | 9/1995 | McNally et al. | 122/13.1 |
| 5,477,913 | A | * | 12/1995 | Polk et al. | |
| 5,531,214 | A | * | 7/1996 | Cheek | 126/351 |
| 6,053,130 | A | * | 4/2000 | Shellenberger | 122/13.1 |

FOREIGN PATENT DOCUMENTS

| | | | | |
|---|---|---|---|---|
| JP | 0133751 | * | 5/1990 | 126/351 |

* cited by examiner

*Primary Examiner*—Gregory Wilson
(74) *Attorney, Agent, or Firm*—Michael Best & Friedrich LLP

(57) ABSTRACT

A multi-function controller for a water heater is advanced comprising a control panel and a plurality of sensors that monitor a variety of functions that impact the operation of a water heater. A flammable gas sensor, placed in proximity to the air intake, detects the presence of an unsafe concentration of gas and issues a signal to the control panel, which subsequently discontinues the operation of the burners. Detection of a blocked vent pipe is achieved by a carbon monoxide sensor placed near the draft hood. The control panel is equipped with circuitry which monitors usage of the heater for a specified time period to develop a pattern of use. Subsequent to the monitoring period, the controller will activate the burners a predetermined time prior to an anticipated period of high use. During periods of low use, the controller will decrease the temperature to which the water is to be heated, thereby resulting in a more efficient heater. Non-volatile memory records data from the sensors so that the operation status of the heater may be ascertained subsequent to a power outage. The control panel contains a plurality of visual alarms, each of which corresponds to a sensor. Consequently, repair and maintenance are simplified because the cause of a malfunction is quickly recognized.

26 Claims, 3 Drawing Sheets

146
136
140
142
10
40
114
20
48
100
110
130
125
46
112
126
128
120
124
30
122
120

CONTROL SYSTEM FOR A WATER HEATER

Matter enclosed in heavy brackets [ ] appears in the original patent but forms no part of this reissue specification; matter printed in italics indicates the additions made by reissue.

BACKGROUND OF THE INVENTION

1. Field of the Invention

The present invention relates generally to water heaters. In particular, the present invention relates to the control of water heaters for proper operation and safety.

2. Discussion of Background

Much of the world has come to depend on having hot water on demand for bathing, laundering, and cooking. Usually this demand is met by water heaters. Water heaters come in two basic types: storage water heaters, which heat water in a tank for use when there is a demand, and instantaneous water heaters, which heat water as it is being drawn through the heater.

Controlling the water heater begins with the temperature of the water it supplies. More specifically, being able to heat the source water to a desired temperature means being able to select that temperature from a range of temperatures and then controlling the water heater so that it does, in fact, heat the water to that temperature, regardless of changes in the many parameters that will affect its operation. Although the temperature of the water leaving the heater is simply a function of the temperature of the water entering the heater and how much net heat is added to it, both the inlet temperature and the amount of heat that is needed will vary. For example, the amount of heat that must be added depends on how well insulated the particular water heater is and how efficiently it transfers heat to the water. Efficiency changes with time as scale builds up on the heat transferring components. Furthermore, the temperature at the outlet may need to be varied depending on how far away from the heater the tap is located. In turn, the amount of heat added is a function of the instantaneous heat addition rate and the duration of heating. Many other factors complicate the control of water temperature, including heat losses, water mixing, overshooting of the setpoint temperature, and so on.

Control is not limited to temperature and the way heat is added. If the water heater uses natural gas as a fuel for combustion to produce heat, control of the flow of gas, ignition of the gas, completeness of combustion, and sensing of gas leaks are also important. There are other factors besides fuel use and delivery that may affect the safe use of the water heater. Furthermore, the response of the control system to a condition that is potentially harmful may vary, depending on the sophistication of the control system. Consequently, there has been considerable development in the control mechanisms of water heaters.

For example, in the area of sensing the presence of harmful gases, including both combustible gases and carbon monoxide, see Teeters' (U.S. Pat. No. 3,909,816) flame color and carbon monoxide sensor and alarm circuit for use with a water heater, and Comuzie, Jr.'s (U.S. Pat. No. 5,280,802) apparatus for detecting "spillage" and "roll-out" gas fumes of a water heater. Spillage gases are those that result from a blocked flue; roll-out gases are those that occur when there is a backup at the flame of the heater. Park, et al., in U.S. Pat. No. 4,893,113, teach the sensing of carbon monoxide and the detoxifying of the sensed carbon monoxide in a water heater. When combustion gases are detected, it is known to cut off the fuel to the water heater or shut off power, as taught, for example, by Kass, et al. in U.S. Pat. No. 5,189,392. A modicum of control of the flue draft for water heaters is taught by Habegger in U.S. Pat. No. 5,039,006. If his controller is unable to obtain adequate flue draft, its spillage sensors shut down the unit.

Devices for detecting flammable gases in general are known. For example, see Sun's (U.S. Pat. No. 5,419,358) flammable gas monitoring system for a boiler, Gazzaz's (U.S. Pat. No. 4,916,437) gas monitoring system for use in a kitchen supplied with gas for cooking, and Risgin, deceased et al.'s (U.S. Pat. No. 4,443,791) multiple gas detection system for industrial environments. The Gazzaz ('437) device will shut off the flow of gas and issue an alarm if a leak is detected. Also, devices for detecting carbon monoxide in apparatus other than water heaters are known, such as Hilt's (U.S. Pat. No. 5,239,980) forced air furnace control system. Devices for detecting multiple gases, including fuel gases and those resulting from combustion of gases, are also known in arts other than water heater design. For example, see Whittle's (U.S. Pat. No. 5,379,026) fuel and combustion gas alarm for building occupants, and Polk, et al.'s (U.S. Pat. No. 5,477,913) control system for gas detection used with a heating and air conditioning unit. A shortage of oxygen at a burner can result in inefficient combustion and an excess of harmful byproducts. An oxygen sensor for burners is taught by Wada, et al. in U.S. Pat. No. 4,482,311. Correspondingly, a surplus of oxygen at the flue can indicate incomplete or inefficient combustion. A device that controls combustion, in part from feedback from oxygen levels sensed in a refinery furnace flue and in part by damper control, is taught by Sun in U.S. Pat. No. 4,330,261. Regulation of damper and fuel line to achieve efficient combustion is taught by Williams in U.S. Pat. No. 4,299,554 in a fluid fuel-fired furnace.

Although various problems of controlling a water heater are addressed by others, including those noted above, the focus is the detection of spillage and roll-out gases and not harmful gases generally, including leaking natural gas and propane. Furthermore, attacking the problem of water heater control—gases, temperature, operation—in piecemeal fashion results in complexity in the overall control system and unnecessary cost and inefficiency.

Therefore, there remains a need for improvements in the approach to control of the various operational systems and safety features of a water heater.

SUMMARY OF THE INVENTION

According to its main features and briefly stated, the present invention is a multiple function, solid state control system for a water heater. The control system comprises a control panel having a microprocessor, mounted to the exterior of the water heater, in electrical connection with a flammable gas sensor, positioned proximate to the air intake. Upon detecting a preselected concentration of a flammable gas, the sensor will issue a signal to the control panel which will prevent ignition of the burners, or shut them off if already in operation. A carbon monoxide sensor, positioned proximate to the draft hood, detects the presence of an unacceptable level of carbon monoxide, indicative of a blocked vent pipe, and also sends a signal to the microprocessor which will prevent, or discontinue, the operation of the burners. Both the flammable gas and carbon monoxide detector contain self-diagnostic circuitry which assures proper sensor operation. In addition, circuitry within the microprocessor monitors the service life of the sensors and will cause an alarm to be initiated when the sensors require replacement.

The control system also monitors a variety of different functions necessary for the proper operation of a water heater. Water temperature is monitored and prevented from rising above a preselected temperature. The burner is monitored to assure the existence of a flame during operation. The current being drawn by both the pilot solenoid valve and the main solenoid valve is monitored for proper valve operation.

Ignition control is achieved by monitoring the number of attempts to ignite the pilot light. If ignition is not accomplished in a preselected number of trials, the controller will subsequently block any attempt at ignition until a reset order has been issued. The controller also monitors the current generated from the motor operating the draft hood, assuring that the hood opens, closes, and maintains its proper orientation during the operation of the water heater.

Upon receipt of a signal from any of the above described sensors, the controller will terminate the operation of the burners and issue a visual and/or auditory alarm.

The controller is also programmed to monitor the use of the water heater and establish a pattern of operation. The controller will monitor the operation of the heater for a period of time, preferably seven days, to determine periods of high usage and periods of low usage. After the initial monitoring period, the controller activates the burners to heat the water to the setpoint temperature a predetermined time period prior to the anticipated high-usage period. During periods of low usage, the controller will set back the temperature approximately 15° F. to conserve energy. If the pattern of use changes subsequent to the seven day monitoring period, the controller will record the changes and modify the schedule according to the new pattern.

In the event of a malfunction, power outage, or other discontinuity in operation, the controller routes to non-volatile memory all salient information such as water temperature, operational status of the sensors, and the age of the carbon monoxide and flammable gas sensors. Consequently, for routine maintenance or repair, the condition of the water heater and the reason for its malfunction can be readily ascertained.

A major feature of the present invention is the placement of the flammable gas sensor, proximate to the air intake channel. Placement of the sensor in this region enables the sensor to sense the presence of a dangerous concentration of flammable gas and issue a signal to the controller prior to the gas reaching the flame. Consequently, the controller is capable of deactivating or preventing the operation of the burners prior to an explosion.

Another major feature of the present invention is the use of a carbon monoxide detector to determine the blockage of the vent pipe. A vent pipe can become blocked by birds, improper roof installation, rusted pipes, or the like. When this occurs, combustion gases back up below the exit to the flue and are referred to as "spillage" gases. These spillage gases contain an unsafe concentration of carbon monoxide. The gases will escape from both the ductwork and burner area of the water heater and enter the surrounding area, causing the danger of injuries and possibly death to individuals in the vicinity. By providing a carbon monoxide sensor, it is possible to detect the presence of an excessive concentration of carbon monoxide and deactivate the burners before the carbon monoxide concentration reaches a hazardous level.

Still another feature of the present invention is safety. The present invention centrally monitors a number of operational conditions that impact safety. Upon issuance of a signal that any of these conditions are outside operating parameters or are failing to function, the controller will halt the operation of the burners and emit an audio and/or visual alarm which details the type of malfunction that has occurred. Consequently, the danger of an explosion, escape of harmful gases, and other hazards associated with the operation of a water heater are minimized. Moreover, by indicating the type of malfunction that has occurred, diagnosis and repair is simplified.

Other features and their advantages will become apparent to those skilled in the design of water heaters from a careful reading of the Detailed Description of Preferred Embodiments accompanied by the drawings.

DETAILED DESCRIPTION OF PREFERRED EMBODIMENT

The present invention advances a multi-function controller for a water heater which centrally and simultaneously controls and monitors a variety of operational parameters.

Figure 1:
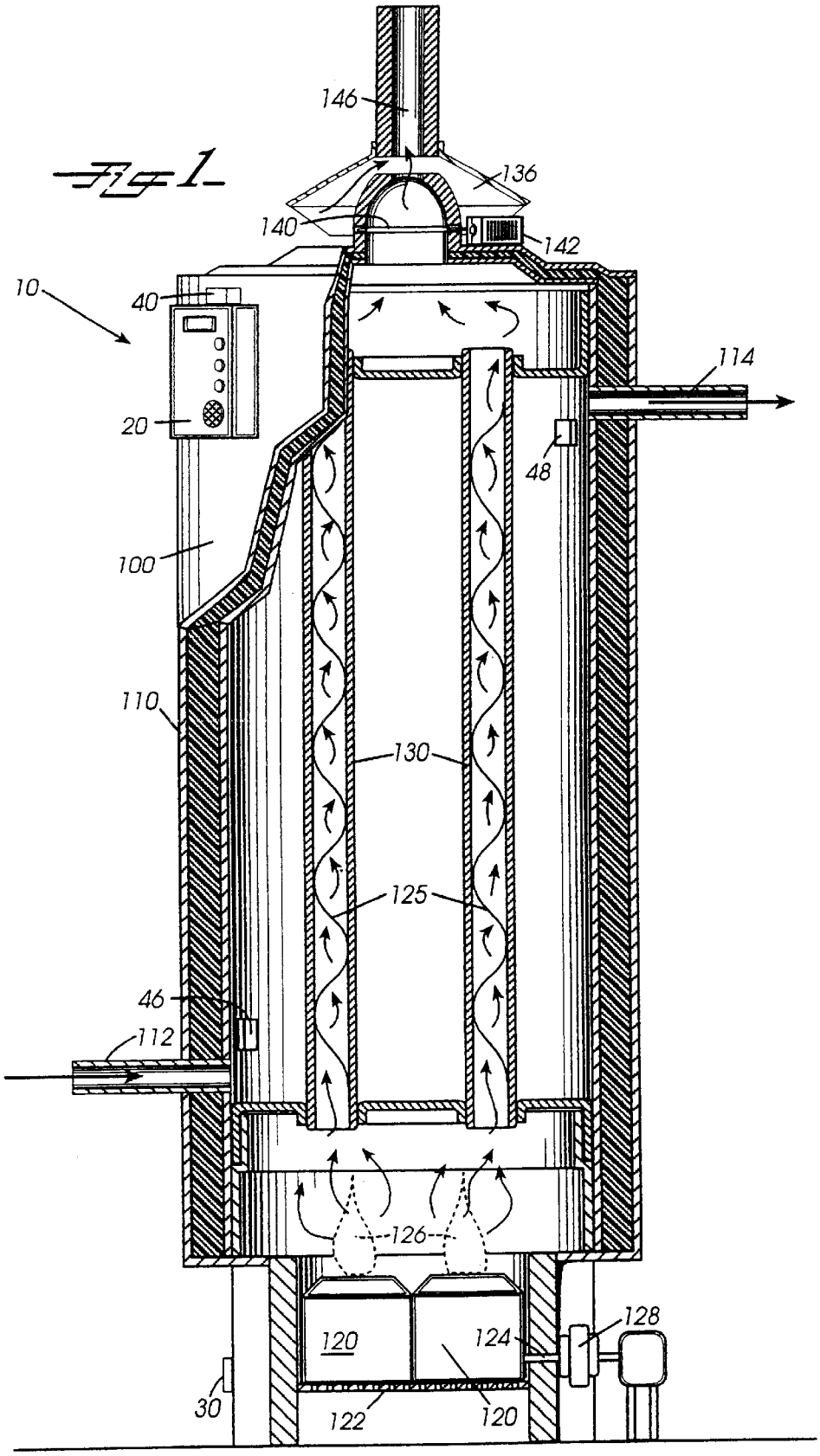
FIG. 1 is a partial cross-sectional side view of a multi-function controller mounted on a water heater, according to a preferred embodiment of the present invention.
Figure 2:
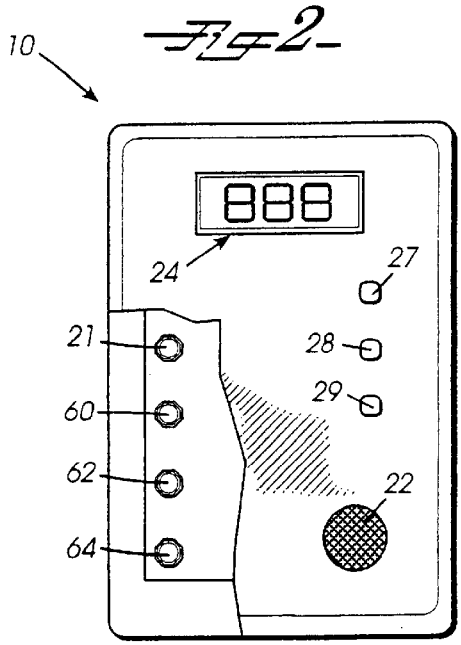
FIG. 2 is a partial cut away front view of a control panel of a multi-function controller, according to a preferred embodiment of the present invention.

Referring now to the FIGS. 1 and 2, there is shown a partial cross-sectional side view and a partial cut away front view, respectively, of a multi-function controller according to a preferred embodiment of the present invention, designated generally by reference numeral 10.

Water heater 100 is comprised of a tank 110 dimensioned to hold a quantity of water therein. Disposed about the bottom of heater 100 is a series of combustion burners 120. In fluid communication with burners 120 are flue baffles 125 positioned inside flues 130. Both baffles 125 and flues 130 are positioned vertically within the interior of tank 110. Positioned atop heater 100 is a draft hood 136 in fluid communication with flues 130. Within draft hood 136 is a damper 140 controlled by a motor 142. Extending from draft hood 136 is a vent pipe 146.

In operation, air is drawn into burners 120 through an air intake 122 and mixed with fuel from main fuel line 124. Burners 120 combust a mixture of air and fuel, sending combustion gases through flues 130. As the gases travel upwards through flues 130, flues 130 act as heat exchangers, transferring heat to the water residing within tank 110. Upon exiting flues 130, the gases enter draft hood 136, mix with air, and exit through vent pipe 146.

Multi-function controller 10 is comprised of a control panel 20 mounted to the exterior of tank 110. Control panel 20 contains a microprocessor 21 and is in electrical connection with a variety of sensors which are discussed below. Control panel 20 contains an auditory alarm 22, a visual display 24 which functions as a visual alarm and displays the temperature of the water and the set temperature, and an increment switch 28 and decrement switch 29 for changing the set temperature. Control panel 20 further includes a reset/select switch 27 for resetting the visual alarms displayed by visual display 24 or selecting water temperature or set temperature. Auditory alarm 22 and visual display 24 are triggered in response to receiving a signal from any of the sensors which indicates that one of the variables is outside designated operational ranges. Control panel 20 is also in electrical connection with burners 120, and is capable of preventing or discontinuing the operation of burners 120 upon receipt of a signal from any of the sensors discussed below.

To prevent ignition of flammable vapors in the surrounding areas, a flammable gas sensor 30 is provided which is capable of sensing a variety of flammable gases, including, but not limited to, natural gas, methane, propane, butane, gasoline, and household solvents. The exact location of flammable gas sensor 30 will vary depending upon the position of burners 120 and air intake 122. However, it is imperative that sensor 30 be positioned at a sufficient distance from flames 126 of burners 120 so that sensor 30 has sufficient time to sense the presence of an unsafe concentration of a flammable gas, alert control panel 20, and permit control panel 20 to discontinue or prevent the operation of burners 120. Preferably, sensor 30 is positioned proximate to air intake 122 so that it may more effectively detect heavier flammable gases, such as propane, gasoline vapor, and kerosene.

Contained within microprocessor 21 of control panel 20 is a circuit check that assures that sensor 30 is operating properly. The circuit check involves detecting a voltage loss across sensor 30. If a preselected voltage is not present across sensor 30, a signal will be sent to microprocessor 21, triggering both the auditory alarm 22 and visual display 24. In addition, microprocessor 21 contains firmware that monitors the service time experienced by sensor 30. When such time reaches a preselected value, approximately seven years, a signal is forwarded to control panel 20, indicating that sensor 30 is in need of replacement.

Sensor 30 is calibrated to issue a signal to microprocessor 21 of control panel 20 when a flammable gas is detected at a preselected concentration. Normally, this concentration is 20% of the lower explosive limit (LEL) for natural gas. A sensor programmed to issue a signal at this concentration will also issue a signal for low concentrations of other flammable gases. A flammable gas sensor suitable for use in the present invention is made by FIGARO USA, Inc.

A carbon monoxide sensor 40 is positioned proximate to draft hood 136. When vent pipe 146 becomes totally or partially blocked due to improper installation, birds or other wildlife, rusted vent pipes, and the like, spent combustion gases exiting flues 130 will build up in vent pipe 146 and eventually draft hood 136. When this occurs, there is a buildup in the carbon monoxide concentration within vent pipe 146 and draft hood 136. Sensor 40 monitors the concentration of carbon monoxide within vent pipe 146, and when such concentration reaches a preselected limit, a signal is sent to microprocessor 21 of control panel 20, which subsequently discontinues operation of burners 120. Any sensor normally used in the art capable of detecting carbon monoxide in excess of 100 parts per million (ppm) can be used in conjunction with the present invention. As with flammable gas sensor 30, microprocessor 21 has firmware that monitors the operational status of the carbon monoxide sensor and its time in service and will issue an appropriate signal to control panel 20 when repair or replacement of sensor 40 is required.

The temperature of the water within tank 110 is monitored by a pair of temperature sensors 46 and 48. Temperature sensor 46 is located within tank 110 and proximate to water inlet 112. Temperature sensor 48 is also positioned within tank 110 and proximate to water outlet 114. The temperature values from temperature sensor 48 are also monitored to prevent the occurrence of "stacking." Stacking occurs in water heaters when water is drawn in a sufficient amount to activate a burner which operates until a temperature sensor, normally located at the bottom half of the heater, senses a particular temperature, at which time the burner is deactivated. Water is then drawn again, causing the reactivation of the burner. As this cycle is repeated frequently, hotter water rises to the top of the tank, and its temperature can exceed that experienced by sensor. The problem of stacking is eliminated by selecting a "setpoint" temperature for water exiting heater 100 through water outlet 114. If the temperature sensed by temperature sensor 48 exceeds this setpoint temperature, a signal is sent to control panel 20, which in turn will discontinue the operation of burners 120. Any thermistor or other temperature sensing device capable of sensing temperature within ±2° F. may be used in conjunction with the present invention.

Figure 3:
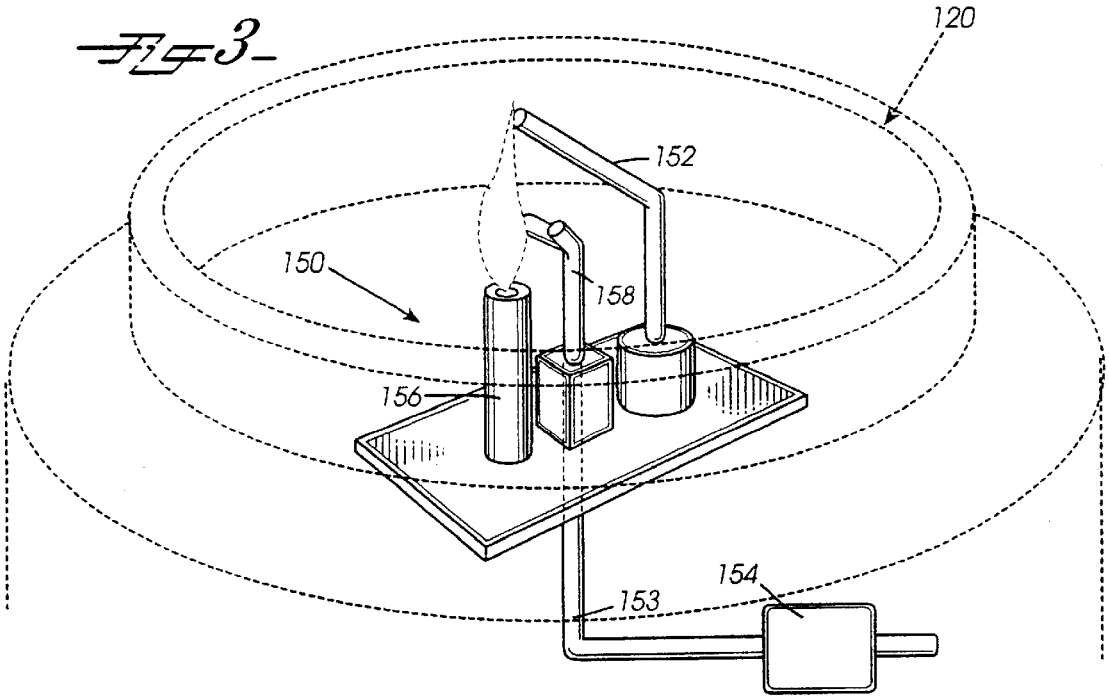
FIG. 3 is a detail of a pilot light assembly equipped with a flame sensor, within a burner shown in ghost, according to a preferred embodiment of the present invention.
Figure 4:
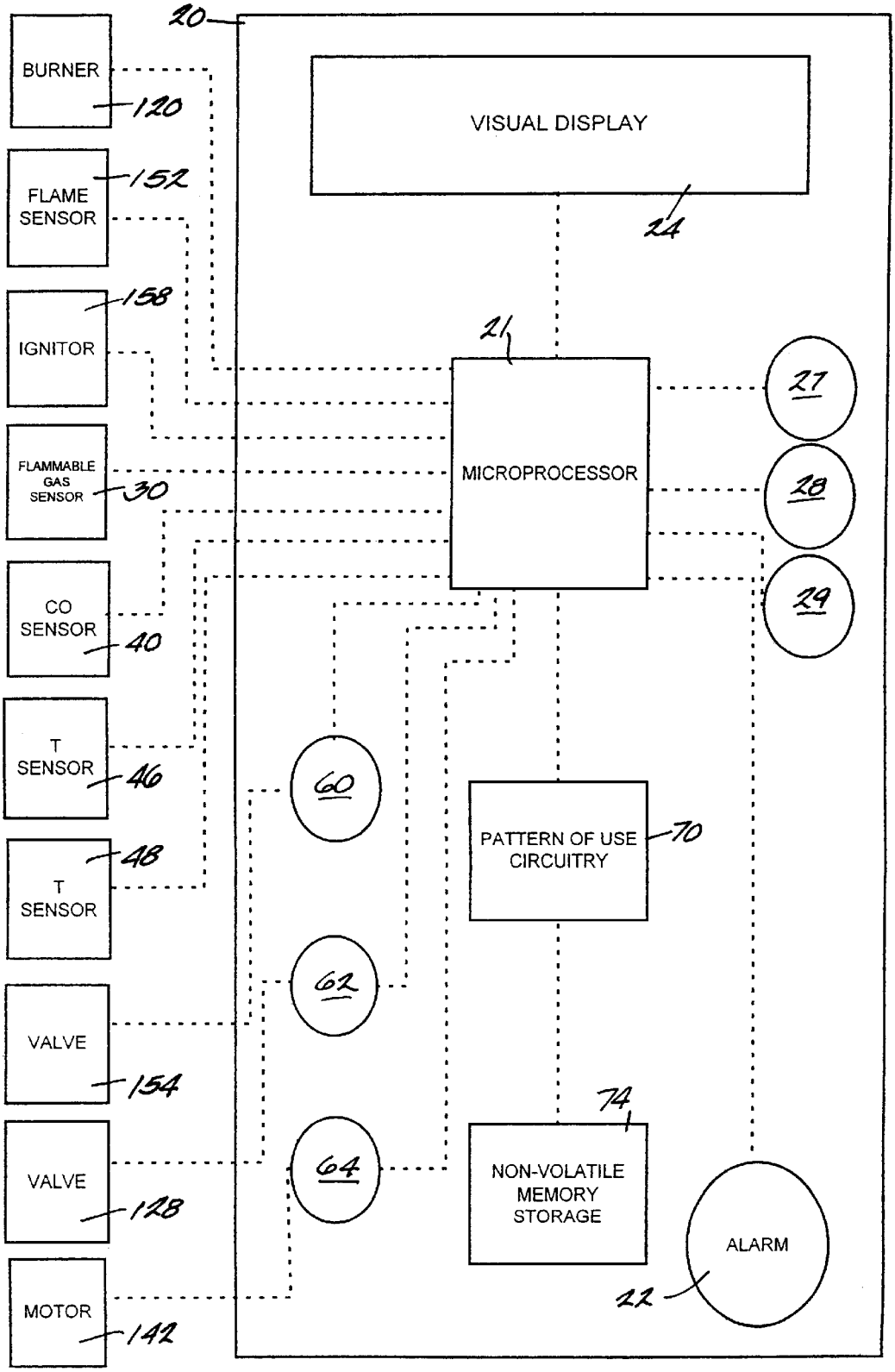
FIG. 4 is a schematic diagram of the control system of the water heater.

Turning now to FIG. 3, there is shown a cross section of a pilot light assembly 150 used to ignite burners 120. Positioned within a burner 120, pilot light assembly 150 comprises a pilot light 156 and an ignitor 158. There are two types of ignitor devices commonly used in the art to light pilot light 156. The first type of device creates a spark which serves to ignite pilot light 156. The second type, entitled hot surface ignition, heats a composite body to a temperature sufficient to cause ignition. Ignition control of burners 120 is accomplished by placing a pilot light flame sensor 152 in proximity to pilot light 156. Flame sensor 152 is preferably a flame rectification device designed to issue a signal to control panel 20 upon sensing the presence of a flame. If pilot light flame sensor 152 fails to recognize the presence of a flame after a predetermined number of attempts at ignition, control panel 20 will prevent any further attempts at ignition and will activate alarms 22 and 24. Subsequent attempts at ignition will require an operator to reset control panel 20 via reset/select switch 27.

In a similar fashion, control panel 20 monitors the presence of a flame from burners 120, via flame sensor 152. Flame sensor 152 will issue a signal to control panel 20 in the absence of a flame from burners 120. Control panel 20 will then discontinue the operation of burners 120.

To assure the proper operation of a solenoid valve 154 that regulates the introduction of fuel, via pilot fuel line 153, into pilot light assembly 150, a current sensor 60 is placed in operational connection with valve 154. Current sensor 60, located within control panel 20, assures that the proper current is being used by valve 154 so that pilot light assembly 150 receives fuel. Similarly, current sensor 62, also located within control panel 20, is placed in operational connection with solenoid valve 128, which controls the fuel entering burners 120 via fuel line 124. In the event that current sensor 60 or 62 sense an improper current value, a signal is sent to control panel 20.

Current sensor 64, also located within control panel 20, is placed in operational connection with motor 142 that operates damper 140. Current sensor 64 senses the current generated by motor 142. If the current sensed is not sufficient to cause the proper operation of damper 140, control panel 20 is issued a signal by current sensor 64.

Control panel 20 is equipped with circuitry 70 that enables the recordation of a pattern of use for water heater 100. Preferably during the first seven days of operation, control panel 20 will monitor heater 100 to determine intervals of high use and periods of low use. The criteria which defines an interval of high or low use is the demand for hot water over a particular interval of time, for example, six (6) hours. After the initial monitoring period, control panel 20 will activate burners 120 a predetermined time period prior to the anticipated high use interval to bring the water within tank 110 to the desired setpoint temperature. During periods of low usage, control panel 20 will reduce the setpoint temperature a preselected number of degrees, preferably 15° F. Reduction of the setpoint temperature reduces the frequency at which burners 120 are activated, which in turn allows water heater 100 to operate more efficiently. In addition, control panel 20 is equipped with circuitry that enables it to record changes to the pattern of use. As used herein, the term "changes" means intervals of high use and low use not recorded during the initial monitoring period. Control panel 20 will incorporate such changes into its pattern of use, thereby creating a new usage pattern that will thereafter be used to control the operation of water heater 100.

Turning now to FIG. 2, each sensor 60, 62, and 64 is electrically connected to control panel 20. Visual display 24 is electronically connected to all of the sensors 60, 62, and 64 as discussed above. When control panel 20 receives a signal from a sensor indicating that a particular operating parameter is outside of a preselected range or there is a malfunction, visual display 24 will provide a visual alarm. Auditory alarm 22 may be wired to emit a sound in response to receiving a signal from any of the above mentioned sensors, or alternatively, be wired to emit sound only in response to a particular sensor or group of sensors. As a result of these alarms, diagnosis, repair, and maintenance of water heater 100 is greatly simplified because an operator can quickly ascertain the cause of a malfunction.

Control panel 20 is also equipped with non-volatile memory storage 74. Information received from the sensors monitoring various operating parameters of water heater 100 are received by control panel 20. As used herein, the phrase "operating parameters" means any physical variable that influences the operation of water heater 100 and is sensed by one of the above described sensors. Such parameters include, but are not limited to, water temperature, various current values, fuel and air flow rates, water flow rate, presence of flammable gas, carbon monoxide concentration, ignition status, and position of the damper. Information from the sensors 60, 62, and 64 is recorded by control panel 20 and subsequently transferred to non-volatile memory. Consequently, if water heater 100 loses power or is disconnected, salient information is protected so that the operation status of water heater 100 can be absolutely determined.

It recognized that although the operation of multi-function controller 10 has been described in conjunction with a gas water heater, it can also be used with electrical resistance water heaters. If the electrical resistance heater is controlled by relays, flammable gases present may be ignited by sparks generated by the relays. Consequently, there still exists a need for flammable gas sensor 30. However, if the electrical resistance heater employs solid state switches, the danger of spontaneous combustion of flammable gases is no longer present. Therefore, flammable gas sensor 30 may be omitted.

It will be apparent to those skilled in the art of water heaters that many modifications and substitutions may be made to the preferred embodiments described above without departing from the spirit and scope of the invention, which is defined by the appended claims.

What is claimed is:

1. A water heater, comprising:

a tank dimensioned for containing a quantity of water, said tank having a top and a bottom;

a heat exchanger positioned in said tank;

means for combusting a mixture of gas and air, said combusting means being positioned proximate to said bottom of said tank, said combusting means in operational connection with said heat exchanger;

a draft hood positioned on said top of said tank, said draft hood being in fluid communication with said heat exchanger;

a vent pipe extending from said draft hood;

an air intake channel, said air intake channel being in fluid communication with said combusting means; and means for controlling said water heater, said controlling means comprising:

a control panel supported by said exterior of said tank, said panel being in operational connection with said combusting means, means carried by said water heater for sensing the presence of flammable gases, said flammable gases sensing means being in electrical connection with said control panel, said sensing means issuing a signal to said control panel when said flammable gases sensing means senses a preselected concentration of a flammable gas, said control panel discontinuing the operation of said combusting means upon receipt of said signal from said flammable gases sensing means, and wherein said flammable gases sensing means is positioned proximate to said air intake channel to sense flammable gases before said flammable gases reach said combusting means.

2. The water heater as recited in claim 1, wherein said preselected concentration is approximately 20% of the lower explosive limit of natural gas.

3. The water heater as recited in claim 1, wherein said controlling means further comprises means for determining the concentration of carbon monoxide in said vent pipe, said carbon monoxide sensing means positioned proximate to said draft hood, said carbon monoxide sensing means being in electrical connection with said control panel, said carbon monoxide sensing means issuing a signal to said control panel when said carbon monoxide sensing means senses a preselected concentration of carbon monoxide in said vent pipe, said control panel discontinuing the operation of said combusting means upon receipt of said signal from said carbon monoxide sensing means.

4. The water heater as recited in claim 1, wherein said combusting means further comprises at least one burner, said at least one burner having a flame, and wherein said controlling means further comprises a means for sensing the presence of said flame, said means for sensing the presence of said flame being in electrical connection with said control panel.

5. The water heater as recited in claim 1, wherein said tank has an outlet, and wherein said controlling means further comprises means for sensing the temperature of said water in said tank, said temperature sensing means being in electrical connection with said control panel and proximate to said outlet, said temperature sensing means issuing a signal to said control panel when said temperature is above a preselected value, said control panel discontinuing the operation of said combusting means upon receipt of said signal from said temperature sensing means.

6. A water heater, comprising:

a tank dimensioned for containing a quantity of water, said tank having a top and a bottom;

a heat exchanger positioned in said tank;

means for combusting a mixture of gas and air, said combusting means being positioned proximate to said bottom of said tank, said combusting means in operational connection with said heat exchanger;

a draft hood positioned on said top of said tank, said draft hood being in fluid communication with said heat exchanger;

a vent pipe extending from said draft hood;

an air intake channel, said air intake channel being in fluid communication with said combusting means; and means for controlling said water heater, said controlling means comprising:

a control panel supported by said exterior of said tank, said panel being in operational connection with said combusting means, means for sensing the presence of flammable gases, said flammable gases sensing means being in electrical connection with said control panel, said sensing means issuing a signal to said control panel when said flammable gases sensing means senses a preselected concentration of a flammable gas, said controlling means discontinuing the operation of said combusting means upon receipt of said signal from said flammable gases sensing means, and means positioned proximate to said draft hood for sensing the presence of a blocked vent pipe, said blocked vent pipe sensing means issuing a signal to said control panel when said vent pipe is blocked, said control panel deactivating said combusting means in response to said signal.

7. The water heater as recited in claim 6, wherein said blocked vent pipe sensing means further comprises means for determining the concentration of carbon monoxide exiting said draft hood, said carbon monoxide sensing means issuing a signal to said control panel when said carbon monoxide sensing means senses a preselected concentration of carbon monoxide.

8. The water heater as recited in claim 6, wherein said combusting means further comprises at least one combustion burner and wherein said controlling means further comprises means for controlling the ignition of said at least one burner, said ignition controlling means being in electrical connection with said control panel.

9. The water heater as recited in claim 6, wherein said tank has an outlet and wherein said controlling means further comprises means proximate to said outlet for sensing the temperature of said water in said tank, said temperature sensing means being in electrical connection with said control panel, said temperature sensing means issuing a signal to said control panel when said temperature is above a preselected value, said control panel discontinuing the operation of said combusting means upon receipt of said signal from said temperature sensing means.

10. The water heater as recited in claim 6, wherein said draft hood further comprises a damper operationally connected to a motor, said motor drawing a current when operating said damper and wherein said controlling means further comprises means for monitoring said current.

11. The water heater as recited in claim 6, wherein said combustion means further comprises:

at least one combustion burner, a pilot light operably connected to said burner, said pilot light having a gas fuel line, a solenoid valve, said valve regulating said gas fuel line, and wherein said controlling means further comprises means for monitoring the current drawn by said valve.

12. A water heater, comprising:

a tank dimensioned for containing a quantity of water, said tank having a top and a bottom;

a heat exchanger positioned in said tank;

means for combusting a mixture of gas and air, said combusting means being positioned proximate to said bottom of said tank, said combusting means in operational connection with said heat exchanger;

a draft hood positioned on said top of said tank, said draft hood being in fluid communication with said heat exchanger, said draft hood having a motor controlled damper;

a vent pipe extending from said draft hood; and means for controlling said water heater, said controlling means further comprising:

means for recording a pattern of use, said pattern of use having a time period, means for modifying an operating parameter in accordance with said pattern of use so that said heater operates more efficiently.

13. The water heater as recited in claim 12, wherein said time period is seven days.

14. The water heater as recited in claim 12, wherein said operating parameter is the temperature of said water in said tank.

15. The water heater as recited in claim 12, wherein said controlling means further comprises means for recording changes in said pattern of use and means for incorporating said changes in said pattern of use into said modifying means.

16. A controller for use with a water heater, said water heater having a tank dimensioned for containing a quantity of water, said tank having a top and a bottom, a water inlet positioned proximate to said bottom of said tank and a water outlet positioned proximate to said top of said tank;

a heat exchanger positioned in said tank;

means for combusting a mixture of gas and air, said combusting means being positioned proximate to said bottom of said tank, said combusting means in operational connection with said heat exchanger;

a draft hood positioned on said top of said tank, said draft hood being in fluid communication with said heat exchanger;

a vent pipe extending from said draft hood;

an air intake channel, said air intake channel being in fluid communication with said combusting means, said controller comprising:

a control panel supported by said exterior of said tank, said panel being in operational connection with said combusting means, means carried by said water heater for sensing the presence of flammable gases, said flammable gases sensing means being in electrical connection with said control panel and positioned so that said flammable gases can be sensed before reaching said combusting means, said sensing means issuing a signal to said control panel when said flammable gases sensing means senses a preselected concentration of a flammable gas, said controlling means discontinuing the operation of said combusting means upon receipt of said signal from said flammable gases sensing means; and means for sensing a blocked vent pipe, said blocked vent pipe sensing means issuing a signal to said control panel when said vent pipe is blocked, said control panel discontinuing the operation of said combusting means in response to said signal.

17. The controller as recited in claim 16, wherein said blocked vent pipe sensing means is positioned proximate to said draft hood of said water heater.

18. The controller as recited in claim 16, wherein said blocked vent pipe sensing means further comprises means for determining the concentration of carbon monoxide exiting said draft hood, said carbon monoxide sensing means positioned proximate to said draft hood, said carbon monoxide sensing means being in electrical connection with said control panel, said carbon monoxide sensing means issuing a signal to said control panel when said carbon monoxide sensing means senses a preselected concentration of carbon monoxide.

19. The controller as recited in claim 16, wherein said combusting means of said water heater is a combustion burner and wherein said controller further comprises means for controlling the ignition of said at least one burner, said ignition controlling means being in electrical connection with said control panel.

20. The controller as recited in claim 16, wherein said controlling means further comprises means proximate to said water outlet for sensing the temperature of said water in said tank, said temperature sensing means being in electrical connection with said control panel, said temperature sensing means issuing a signal to said control panel when said temperature is above a preselected value, said control panel terminating the operation of said combusting means upon receipt of said signal from said temperature sensing means.

21. The controller as recited in claim 16, wherein said draft hood further comprises a damper operationally connected to a motor, said motor drawing a current when operating said damper and wherein said controlling means further comprises means for monitoring said current.

22. The controller as recited in claim 16, wherein said combustion means of said heater further comprises:

at least one combustion burner, a pilot light operably connected to said burner, said pilot light having a gas fuel line, a solenoid valve, said valve regulating said gas fuel line, and wherein said controller further comprises means for monitoring the current drawn by said valve.

23. The controller as recited in claim 16, wherein said combustion means of said heater further comprises at least one combustion burner, said at least one burner having a gas fuel line, a solenoid valve, said valve regulating said gas fuel line, and wherein said controller further comprises means for monitoring the current drawn by said valve.

24. The controller as recited in claim 16, further comprising:

means for recording a pattern of use, said pattern of use having a time period, means for modifying an operating parameter in accordance with said pattern of use so that said heater operates more efficiently.

25. The controller as recited in claim 16, further comprising:

means for recording the operating parameters of said heater, means for storing said operating parameters in nonvolatile memory.

*26. A water heater, comprising:*

*a tank dimensioned for containing a quantity of water, said tank having a top and a bottom;*

*a heat exchanger positioned in said tank;*

*means for combusting a mixture of gas and air, said combusting means being positioned proximate to said bottom of said tank, said combusting means in operational connection with said heat exchanger;*

*an air intake in fluid communication with said combusting means; and*

*means for controlling said water heater, said controlling means comprising:*

*a control supported by said tank, said control being in operational connection with said combusting means,*

*means carried by said water heater for sensing the presence of flammable gases, said flammable gases sensing means issuing a signal to said control when said flammable gases sensing means senses a preselected concentration of a flammable gas, said control discontinuing the operation of said combusting means upon receipt of said signal from said flammable gases sensing means, and wherein said flammable gases sensing means is positioned proximate to said air intake channel to sense flammable gases before said flammable gases reach said combusting means.*

* * * * *